United States Patent
Sato

(10) Patent No.: US 10,466,668 B2
(45) Date of Patent: Nov. 5, 2019

(54) INFORMATION PROCESSING APPARATUS, SYSTEM, CONTROL METHOD, AND STORAGE MEDIUM

(71) Applicant: CANON KABUSHIKI KAISHA, Tokyo (JP)

(72) Inventor: Junji Sato, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 104 days.

(21) Appl. No.: 15/459,632

(22) Filed: Mar. 15, 2017

(65) Prior Publication Data

US 2017/0277148 A1   Sep. 28, 2017

(30) Foreign Application Priority Data

Mar. 22, 2016 (JP) ................................ 2016-057522
Feb. 16, 2017 (JP) ................................ 2017-027291

(51) Int. Cl.
*G05B 17/02* (2006.01)
*B33Y 50/02* (2015.01)
*G05B 19/4099* (2006.01)

(52) U.S. Cl.
CPC ............. *G05B 17/02* (2013.01); *B33Y 50/02* (2014.12); *G05B 19/4099* (2013.01); *G05B 2219/49023* (2013.01)

(58) Field of Classification Search
CPC ..... B29C 67/0088; B33Y 50/02; G05B 17/02; G05B 2219/49023
See application file for complete search history.

(56) References Cited

U.S. PATENT DOCUMENTS

| | | | | |
|---|---|---|---|---|
| 4,958,188 A | * | 9/1990 | Miyamoto | G03G 15/50 399/11 |
| 5,452,438 A | * | 9/1995 | Umeda | G03G 15/55 714/1 |
| 6,336,007 B1 | * | 1/2002 | Sugisaki | B41J 29/38 399/11 |
| 2006/0033804 A1 | * | 2/2006 | Dan | G02B 26/121 347/230 |
| 2015/0154575 A1 | * | 6/2015 | Krieger | B29C 67/0088 705/26.1 |
| 2015/0283760 A1 | * | 10/2015 | Willis | B29C 64/393 700/98 |
| 2016/0023404 A1 | * | 1/2016 | Anderson | B29C 67/0088 700/119 |
| 2016/0067927 A1 | * | 3/2016 | Voris | B29C 67/0088 700/98 |

(Continued)

FOREIGN PATENT DOCUMENTS

JP        2005-26789 A        1/2005

*Primary Examiner* — Kenneth M Lo
*Assistant Examiner* — Chad G Erdman
(74) *Attorney, Agent, or Firm* — Canon U.S.A., Inc. IP Division

(57) ABSTRACT

An information processing apparatus comprising an identifying unit configured to identify a part being a forming target in the forming apparatus on the basis of information acquired from a forming apparatus for forming a three-dimensional object, an acquiring unit configured to acquire model data describing a shape of the identified part to form the part in the forming apparatus, and an instructing unit configured to instruct the forming apparatus to form the identified part by using the acquired model data.

12 Claims, 21 Drawing Sheets

(56) References Cited

U.S. PATENT DOCUMENTS

| | | | |
|---|---|---|---|
| 2016/0167307 A1* | 6/2016 | Eramian | B29C 67/0088 |
| | | | 700/98 |
| 2016/0274978 A1* | 9/2016 | Strohmenger | G05B 13/04 |
| 2017/0057170 A1* | 3/2017 | Gupta | B29C 67/0088 |
| 2017/0098014 A1* | 4/2017 | Rawlings | G06F 17/50 |
| 2017/0186071 A1* | 6/2017 | Dodd | G06Q 30/0633 |
| 2017/0218660 A1* | 8/2017 | Muchna | E05B 47/0002 |
| 2017/0225400 A1* | 8/2017 | Lee | B29C 67/0088 |
| 2017/0232515 A1* | 8/2017 | DeMuth | B33Y 10/00 |
| | | | 419/53 |
| 2018/0368351 A1* | 12/2018 | Theelen | B33Y 10/00 |

* cited by examiner

FIG. 4

| PART ID | PART NAME | MODEL DATA | RECOMMENDED MATERIAL | MODELING TIME (MIN) | MATERIAL USAGE (g) | REPLACEMENT INSTRUCTIONS | FORMING DATE/TIME |
|---|---|---|---|---|---|---|---|
| 00000001 | FRONT COVER A | FrontCoverA.xxx | PLA, | 120 | 120 | PULL GREEN LEVER TOWARD YOU... | ... |
| 00000002 | FRONT COVER B | FrontCoverB.xxx | PLA, | 150 | 200 | ... | ... |
| 00000003 | EXHAUST FAN | ExhaustFan.xxx | PLA, ABS | 90 | 50 | ... | 12/25/2015 10:47 |
| ... | ... | ... | ... | ... | ... | ... | ... |

FIG. 5

| ERROR CODE | PART ID | FORMABILITY | ... |
|---|---|---|---|
| E000-0001 | 00000001 | TRUE | ... |
| E000-0002 | 00000001, 00000002 | FALSE | ... |
| E000-0003 | 00000003 | TRUE | ... |
| E000-0004 | 00000004 | FALSE | ... |
| ... | ... | ... | ... |

FIG. 9

| DATE/TIME | MESSAGE |
|---|---|
| 12/24/2015 19:50 | ERROR HAS OCCURRED (ERROR CODE: E000-0003). |
| 12/25/2015 10:47 | FORMING WAS EXECUTED (PART ID = 00000003, MATERIAL = PLA, PREDICTED COMPLETION TIME = 12/25 12:17). |
| 12/25/2015 15:13 | FORMING HAS COMPLETED (SUCCESS). |
| 12/25/2015 16:01 | ERROR HAS BEEN SOLVED (ERROR CODE: E000-0003). |
| ... | ... |

FIG. 10A

PRINTER LIST

| PRINTER NAME | MODEL | STATUS | ... | |
|---|---|---|---|---|
| PRINTER 1 | ModelA | PREPARATION COMPLETER | ... | [DETAIL] ~1001 |
| PRINTER 2 | ModelX | FORMING (68% - 53 MIN. LEFT) | ... | [DETAIL] |
| PRINTER 3 | ModelX | ERROR (E000-0003) | ... | [DETAIL] |

DETAILS OF PRINTER

PRINTER INFORMATION

PRINTER NAME: PRINTER 3
MODEL: ModelX
LOCATION: DESIGN ROOM 1
ADMINISTRATOR MAIL ADDRESS: adm@xxxxxxxx.com

[EDIT] ~1002

STATUS

MATERIAL TYPE: PLA
MATERIAL REMAINING AMOUNT: 8 m
OPERATING STATUS: PREPARATION COMPLETED
PART INFORMATION:
ERROR STATUS: E000-0003 ~1003

[BACK TO LIST]

FIG. 10C

DETAILS OF PRINTER

PRINTER INFORMATION

PRINTER NAME: PRINTER 3
MODEL: ModelX
LOCATION: DESIGN ROOM 1
ADMINISTRATOR MAIL ADDRESS: adm@xxxxxxxx.com

~1002
EDIT

STATUS

MATERIAL TYPE: PLA
MATERIAL REMAINING AMOUNT: 8 m
OPERATING STATUS: PREPARATION COMPLETED
PART INFORMATION: EXHAUST FAN WAS REPLACED (12/25, 10:47)
(PART ID = 00000003, MATERIAL = PLA)
ERROR STATUS:

~1004

BACK TO LIST

FIG. 13

| MODEL | PART ID | PART NAME | MODEL DATA | RECOMMENDED MATERIAL | MODELING TIME (MIN) | MATERIAL USAGE (g) | REPLACEMENT INSTRUCTIONS | FORMING DATE/TIME | ... |
|---|---|---|---|---|---|---|---|---|---|
| Model A | 00000001 | FRONT COVER A | ModelA¥FrontCoverA.xxx | PLA, | 120 | 120 | PULL GREEN LEVER TOWARD YOU... | | ... |
| Model A | 00000002 | FRONT COVER B | ModelA¥FrontCoverB.xxx | PLA, | 150 | 200 | ... | | ... |
| Model A | 00000003 | EXHAUST FAN | ModelA¥ExhaustFan.xxx | PLA, ABS | 90 | 50 | ... | 12/25/2015 10:47 | ... |
| ... | | | | | | | | ... | ... |
| Model X | 00000001 | FRONT COVER C | ModelX¥FrontCoverC.xxx | PLA, | 60 | 60 | ... | | ... |
| ... | | | | | | | | ... | ... |

FIG. 14

| MODEL | ERROR CODE | PART ID | FORMABILITY IN 3D PRINTER WITH THE ERROR | FORMABILITY IN OTHER 3D PRINTER | ... |
|---|---|---|---|---|---|
| Model A | E000-0001 | 00000001 | TRUE | TRUE | ... |
| Model A | E000-0002 | 00000001, 00000002 | FALSE | TRUE | ... |
| Model A | E000-0003 | 00000003 | TRUE | TRUE | ... |
| ... | ... | ... | ... | ... | ... |
| Model X | E000-0001 | 00000001 | TRUE | TRUE | ... |
| ... | ... | ... | ... | ... | ... |

FIG. 16

```
DETAILS OF PRINTER

PRINTER INFORMATION

PRINTER NAME: PRINTER 3
                  MODEL: ModelX
               LOCATION: DESIGN ROOM 1
  ADMINISTRATOR MAIL ADDRESS: adm@xxxxxxxx.com           ~1002
                                                    [ EDIT ]

STATUS

MATERIAL TYPE: PLA
  MATERIAL REMAINING AMOUNT: 8 m
         OPERATING STATUS: PREPARATION COMPLETED   ~1601
         PART INFORMATION:
            ERROR STATUS: E000-0003

THE FOLLOWING PART MAY POSSIBLY BE FAILED:
            · EXHAUST FAN

FORM AND REPLACE THE PART ABOVE FOR SOLVING ERROR.
            IF REPLACEMENT DOES NOT SOLVE ERROR, CONTACT CALL CENTER.
                                                          ~1602
            FORMABLE PRINTER: [ PRINTER 1         ▽ ]

IF PRINTER 1 IS USED: ~1603
               APPROXIMATE FORMING TIME: 2 HRS
               APPROXIMATE MATERIAL USAGE: 120 g
                                                  ~1604
                                  [ EXECUTE FORMING ]

[ BACK TO LIST ]
```

| PRODUCT CODE | PRODUCT NAME | PRODUCT VENDER | PART ID | PART NAME | MODEL DATA | RECOMMENDED MATERIAL | REPLACEMENT INSTRUCTIONS | ... |
|---|---|---|---|---|---|---|---|---|
| P10000 | 3D PRINTER 630 | vender1 | 00000001 | FRONT COVER A | http://vendor1.co.jp/FrontCover630A.xxx | PLA, | PULL GREEN LEVER TOWARD YOU... | ... |
| P10000 | 3D PRINTER 630 | vender1 | 00000002 | FRONT COVER B | http://vendor1.co.jp/FrontCover630B.xxx | PLA, | ... | ... |
| P10001 | 3D PRINTER 730 | vender1 | 00000001 | FRONT COVER A | http://vendor1.co.jp/FrontCover730A.xxx | PLA, | ... | ... |
| 999T4300 | SCANNER ZXL | vender2 | 00000003 | COVER HINGE (RIGHT) | http://vendor2.co.jp/coverhingeA.xxx | PLA, ABS | ... | ... |
| ... | ... | ... | ... | ... | ... | ... | ... | ... |

INFORMATION PROCESSING APPARATUS, SYSTEM, CONTROL METHOD, AND STORAGE MEDIUM

BACKGROUND OF THE INVENTION

Field of the Invention

The present disclosure relates to an information processing apparatus, a system, a control method, and a storage medium.

Description of the Related Art

A forming apparatus forming a three-dimensional object, which is a solid object, on the basis of model data is generally called a three-dimensional (3D) printer, and such 3D printers have widely and rapidly spread in recent years. A technology relating to a sold structure is also called Additive Manufacturing. On the other hand, a 2D (two-dimensional) printer corresponds to a printing machine such as a multifunction peripheral which prints plenarily on paper (sheet).

Forming methods for 3D printers may include, for example, FDM or Fused Deposition Modeling and STL or Stereo lithography. The forming methods may further include SLS or Selective Laser Sintering and an ink-jet method. A consumable material made of raw materials depending on a forming method is used for forming an object. For example, some of recently emerged FDM (Fused Deposition Modeling) 3D printers are reasonable and are easily operable by a general consumer. Also, 3D printers have been utilized by companies for various applications including use of a 3D printer for manufacturing a prototype or a product.

In a 3D printer as described above, an error may occur that a component part in the 3D printer fails.

Japanese Patent Laid-Open No. 2005-26789 discloses a technology relating to ordering of a part in a case where a multifunction peripheral, including but not limited to a 3D printer, identifies the part causing a failure.

According to Japanese Patent Laid-Open No. 2005-26789 above, an ordering procedure for a part causing a failure in a multifunction peripheral can automatically be performed. However, transporting the ordered part from a supplier may take time, and, as a result, there is a possibility that a longer time may be required to the arrival of the ordered part.

For preparation against a failure in an electronic apparatus such as a multifunction peripheral and a 3D printer, parts in the apparatus may be procured in advance and be managed in stock on hand. However, management of all types of parts in stock for preparation against sudden occurrence of a failure may possibly waste space and costs for custody.

SUMMARY OF THE INVENTION

An information processing apparatus comprising an identifying unit configured to identify a part being a forming target in the forming apparatus on the basis of information acquired from a forming apparatus for forming a three-dimensional object, an acquiring unit configured to acquire model data describing a shape of the identified part to form the part in the forming apparatus, and an instructing unit configured to instruct the forming apparatus to form the identified part by using the acquired model data.

Further features of the disclosure will become apparent from the following description of exemplary embodiments with reference to the attached drawings.

BRIEF DESCRIPTION OF THE DRAWINGS

FIG. 4 illustrates examples of parts information.

FIG. 5 illustrates examples of error information.

FIG. 9 illustrates examples of error information to be transmitted from the 3D printer 102 to the management server 104.

FIGS. 10A to 10C illustrate 3D printer management screen examples to be displayed on the user interface in the management server.

FIG. 13 illustrates examples of the parts information.

FIG. 14 illustrates examples of the error information.

FIG. 16 illustrates an example of a screen showing 3D printer details on the user interface of the management server.

FIG. 17 illustrates an example of an authentication information input screen in a step in the part forming processing.

FIG. 20 illustrates examples of parts information.

DESCRIPTION OF THE EMBODIMENTS

The best modes for implementing the present disclosure will be described with reference to drawings.

First Embodiment

Figure 1:
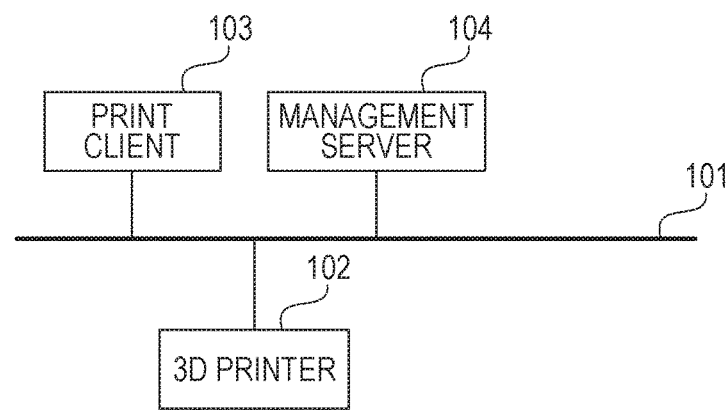
FIG. 1 illustrates an example configuration of a system.

FIG. 1 is a block diagram illustrating a configuration of a system according to the present disclosure.

A network 101 may be an intranet or a local area network (LAN). A 3D printer 102 is an example forming apparatus configured to form a three-dimensional object, which is a solid object, on the basis of model data. A print client 103 may be of any one of various types, such as a personal computer, a tablet computer, and a smart phone. A management server 104 may be a computer capable of receiving information from the 3D printer 102 and transmitting a control instruction to the 3D printer 102 to function as a management apparatus configured to manage information regarding the 3D printer.

The 3D printer 102, the print client 103 and the management server 104 are capable of transmitting and receiving information mutually over the network 101. The network 101 may be a wireless network such as a wireless LAN. The network 101 may be a public network such as the Internet if it is capable of transmitting and receiving information.

Figure 2:
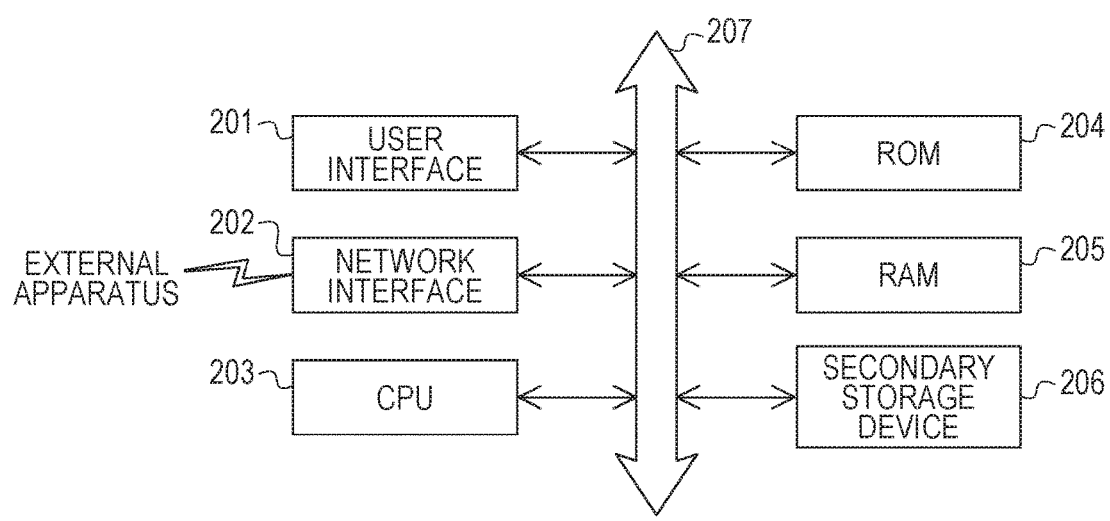
FIG. 2 illustrates an example configuration of modules of information processing functions of a 3D printer, a print client, and a management server.

FIG. 2 illustrates a configuration of modules having information processing functions of the 3D printer 102, the print client 103, and the management server 104. A user interface 201 is usable for inputting/outputting information and signals through a display, a keyboard, a mouse, a touch panel, and buttons. A computer which does not have these hardware modules may be connected to and be operated by another computer through a remote desktop or a remote shell, for example. A network interface 202 may be connected to a network such as a LAN to communicate with another computer or a network device, for example. A CPU 203 is configured to execute programs loaded from a ROM 204, a RAM 205, and a secondary storage device 206, for example. The ROM 204 records an installed program and data. The RAM 205 is a temporary memory area. The secondary storage device 206 may be a storage device such as an HDD and a flash memory. These components are connected via an internal bus 207.

The 3D printer 102 further includes hardware components (not illustrated) depending on an applied forming method. Hardware components depending on an applied forming method may include an engine unit for the 3D printer 102 more specifically. The engine unit may include a CPU, a ROM and a RAM in addition to hardware components, which are controlled by a CPU, depending on an applied forming method. Such forming methods may include FDM or Fused Deposition Modeling, and STL or Stereo lithography. Other forming methods may include SLS or Selective Laser Sintering, and an ink-jet method, for example.

Figure 3:
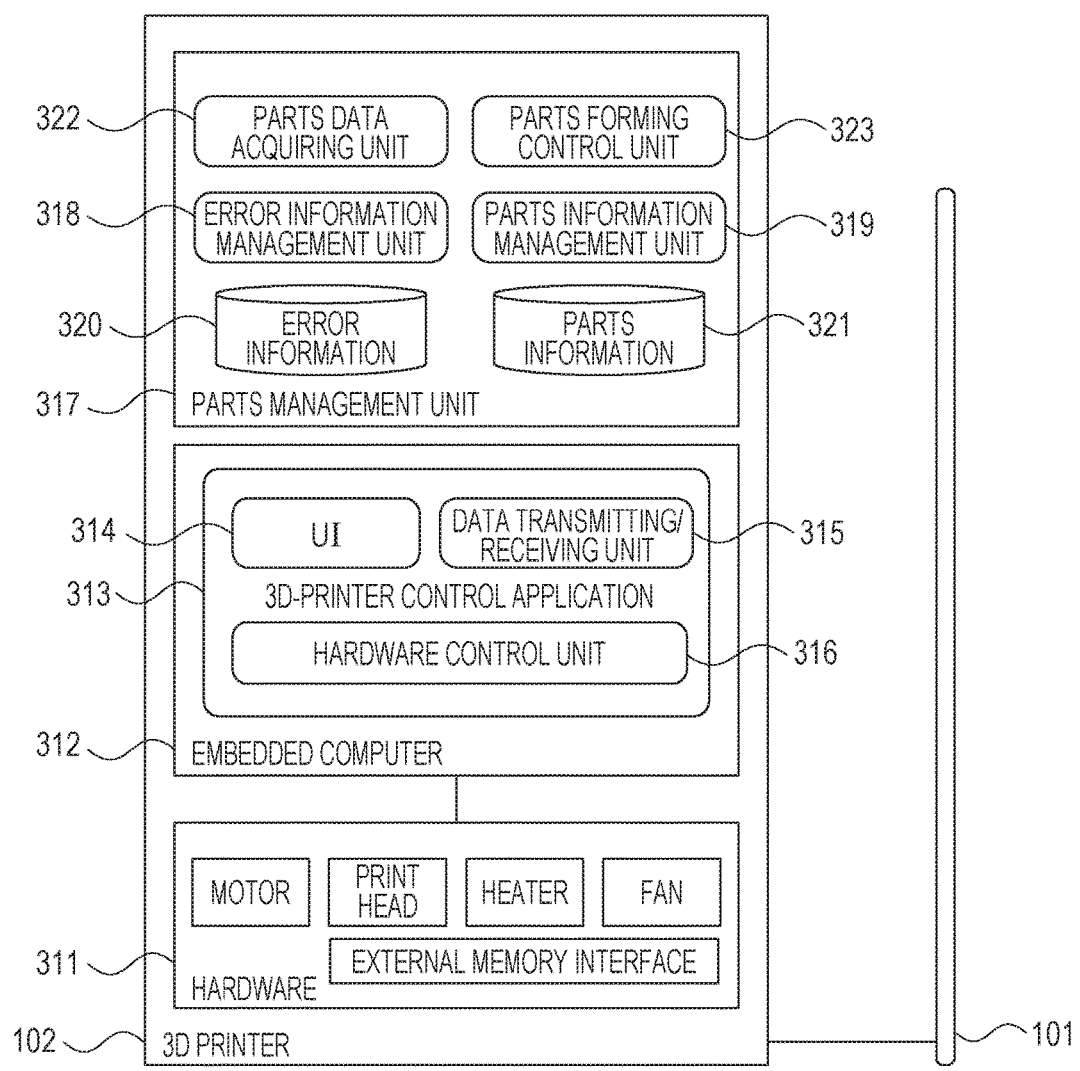
FIG. 3 illustrates an example software configuration and an example partial hardware configuration in the 3D printer.

FIG. 3 illustrates a software configuration and a partial hardware configuration in the 3D printer 102.

Hardware 311 is a hardware unit relating to forming in the 3D printer 102. The hardware in the 3D printer depends on an applied forming method. For example, in a case where FDM is applied, the hardware may include a print head (head, extruder), a motor configured to drive a stage or the print head in X, Y, and Z axis directions, a heater configured to heat nozzles in the print head, and a fan configured to cool and supply and exhaust air, for example. The 3D printer 102 may further has an external memory interface for using an external memory such as a USB memory.

A computer 312 is embedded in the 3D printer 102. The embedded computer is specific to a required function and does not include unnecessary functions, performance and parts for cost reduction, compared with a general-purpose computer. The embedded computer 312 may be a general-purpose computer in accordance with functions and performances in the 3D printer. A 3D printer control application 313 is to be executed on the embedded computer 312. The 3D printer control application 313 includes a user interface (UI) 314, a data transmitting/receiving unit 315, and a hardware control unit 316.

The user interface 314 may be a low-cost device having a combination of an LCD configured to display some lines of text and hardware operation buttons or an LCD with a touch panel. A user interface may be provided which is displayed on a web browser running on a terminal such as the print client 103 for accessing the 3D printer 102 through the web browser. A display content on the user interface 314 may provide a state of the 3D printer. The user interface 314 may be operated to instruct the 3D printer to perform a requested process.

The data transmitting/receiving unit 315 is configured to transmit and receive instructions and data to and from the external print client 103 and the management server 104. In accordance with an instruction received through the user interface 314 and the data transmitting/receiving unit 315 or an instruction issued by the 3D printer control application 313, the hardware control unit 316 is configured to cause the components in the hardware configuration 311 to output a formed object and execute pre-processing and post-processing to be performed for the output.

The forming unit according to this exemplary embodiment includes the hardware 311 having a print head configured to output a consumable material and a heater configured to heat nozzles of the print head and a hardware control unit 316 configured to control those hardware components.

A parts management unit 317 is configured to manage information regarding parts usable in the 3D printer 102 and use states of parts actually used therein. An error information management unit 318 is configured to manage information regarding an error in the 3D printer 102. A parts information management unit 319 is configured to manage information regarding parts in the 3D printer 102. Error information 320 is information regarding an error to be managed by the error information management unit 318. Parts information 321 is information regarding parts to be managed by the parts information management unit 319. A parts data acquiring unit 322 is configured to acquire model data regarding parts on the basis of data of the error information 320 and the parts information 321.

The model data here are 3D model data representing a shape of a part. File format examples of model data may include STL (Standard Triangulated Language). STL is a file format saving data representing a three-dimensional shape and may often be used as a file format for 3D model data. The object data file format may not be STL if it is a file format representing a three-dimensional shape.

A part forming control unit 323 is configured to control whether a part is to be formed or not on the basis of data of the error information 320 and the parts information 321. The error information 320 and the parts information 321 may be recorded in files, databases or other formats in a file system.

FIG. 4 illustrates examples of the parts information 321. An item "PART ID" in the parts information 321 corresponds to identification information by which a part included in the 3D printer 102 can be uniquely identified. An item "PART NAME" corresponds to a name of a part. An item "MODEL DATA" corresponds to a location of 3D model data for forming a part. In the examples in FIG. 4, each model data represents a file name, and an entity of the model data is stored in the secondary storage device 206 in the 3D printer 102. The location of the model data can be any location which can be referred from the 3D printer 102. For example, such model data may be arranged in a storage service on a network such as the Internet. In this case, the item "MODEL DATA" in FIG. 4 corresponds to a URL of the model data.

An item "RECOMMENDED MATERIAL" corresponds to a type of material recommended for forming the corresponding part. For example, a consumable material such as an ABS resin and a PLA resin may be used in FDM or Fused Deposition Modeling. A water-soluble consumable material may be used for forming a support to be used during forming as required. In a case where forming is performed by using a material being special powder of gypsum, for example, and an adhesive, the adhesive to be used for the forming may also contain a consumable material.

An item "FORMING TIME" corresponds to a requisite time for forming the corresponding part. The item "FORMING TIME" may include times for pre-processing and post-processing. An item "CONSUMABLE MATERIAL USAGE" corresponds to an amount of a material for forming the corresponding part. The item "CONSUMABLE MATERIAL USAGE" may include not only an amount of a consumable material to be used for forming an object but also an amount of consumable material to be used for a support as described above. An item "REPLACEMENT INSTRUCTIONS" corresponds to a procedure for replacing the corresponding part, which may be text or a URL of a website where instructions for the procedure are provided. An item "FORMING DATE/TIME" corresponds to a date and a time when the corresponding part is formed in the 3D printer 102 and may be a blank if the corresponding part has not been formed.

FIG. 5 illustrates examples of the error information 320. An item "ERROR CODE" corresponds to an identifier for uniquely identifying an error that may possibly occur in the 3D printer 102. An item "PART ID" corresponds to a part that may possibly cause the corresponding error. In other words, the part under the item "PART ID" corresponds to a part recommended to be replaced for solving the error. An item "FORMABILITY" corresponds to information regarding whether the part under the item "PART ID" can be formed in the 3D printer 102 having the error or not at the time when the error occurs.

According to this embodiment, a part to be replaced for solving an error occurring in a 3D printer is formed in the 3D printer having the error. Particularly, in a case where no other 3D printer is available near the 3D printer having an error or a case where it is difficult to judge whether another near 3D printer can form the part or not, this embodiment can be effective.

The parts information in FIG. 4 and the error information in FIG. 5 may be saved in the secondary storage device 206 upon shipment of the 3D printer 102 and may be acquired from the management server 104 or through the Internet to update over the network 101.

Figure 6:
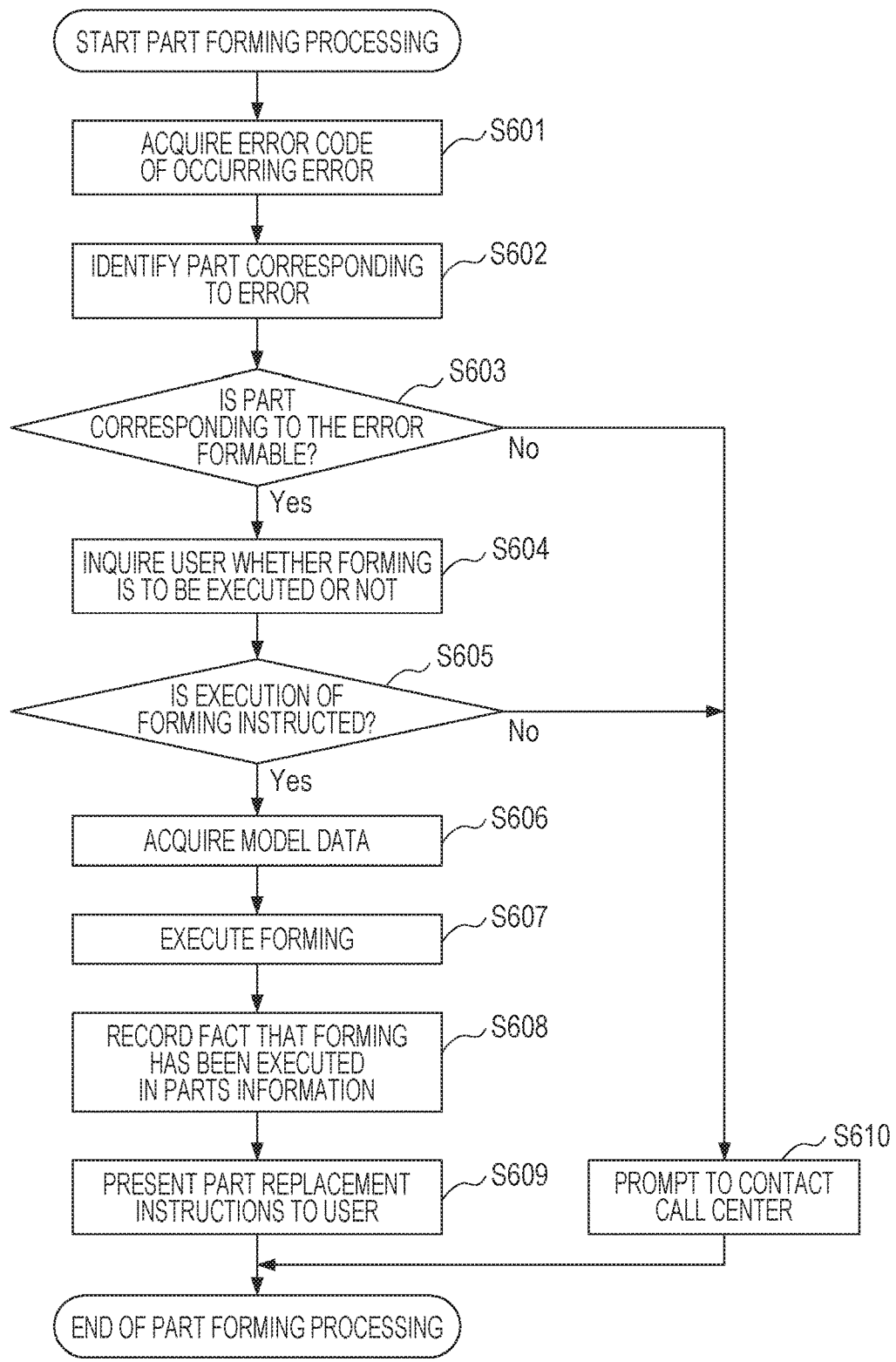
FIG. 6 is a flowchart illustrating an example flow of part forming processing to be performed in a case where an error occurs in the 3D printer.

FIG. 6 is a flowchart illustrating a flow of part forming processing in the 3D printer 102 in a case where an error occurs in the 3D printer 102. The processing illustrated in the flowchart in FIG. 6 may be executed by the parts management unit 317. In other words, the processing in the flowchart in FIG. 6 may be implemented by the CPU 203 in the 3D printer 102 by loading and executing a program recording in the secondary storage device 206.

In S601, the part forming control unit 323 acquires an error code of an error occurring in the 3D printer 102 from the 3D printer control application 313.

In S602, the part forming control unit 323 acquires, from the error information 320, detail information of the error code acquired in S601 through the error information management unit 318 and identifies a part corresponding to the error. Here, the expression "part corresponding to the error" refers to a part in a 3D printer to be replaced for solving an error.

In S603, the part forming control unit 323 judges whether the part identified in S602 can be formed or not on the basis of the error information 320 and the parts information 321. More specifically, if the value of "FORMABILITY" for the error in FIG. 5 is "TRUE" and if a consumable material prepared usably for forming in the 3D printer 102 satisfies a condition, the part forming control unit 323 judges that it can be formed. In order to satisfy the condition for a consumable material, the type of material mounted in the 3D printer 102 is to match with the RECOMMENDED MATERIAL" for the part corresponding to the error in FIG. 4, and a sufficient amount of the material is to be remained. The remaining amount of a consumable material may include the amount of a replaceable consumable material prepared in hand. If it is judged that the part can be formed, the processing moves to S604. If it is judged that the part cannot be formed, the processing moves to S610.

Figure 7A:
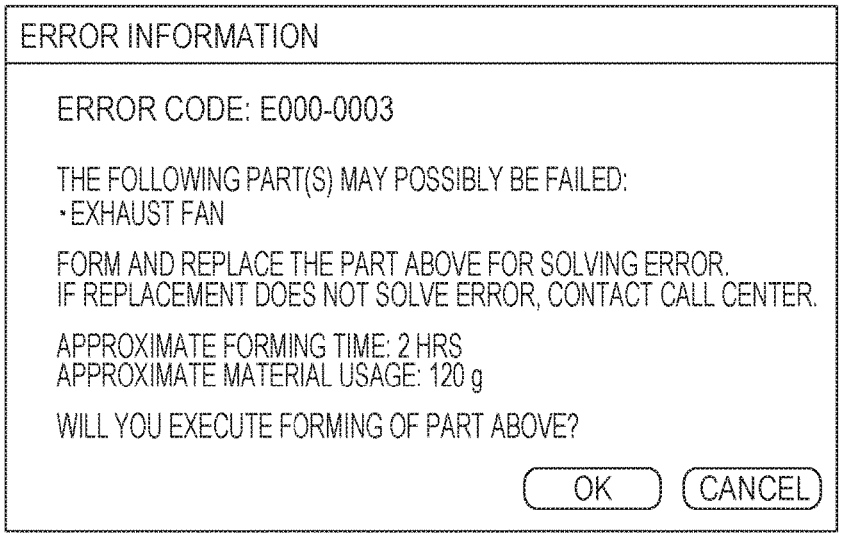
FIGS. 7A to 7C illustrate user interface screen examples when an error occurs.

In S604, the part forming control unit 323 inquires a user whether forming of the part is to be executed or not through the user interface 314 (FIG. 7A, which will be described below).

In S605, the part forming control unit 323 judges whether a user has instructed to form the part or not. If it is judged that the forming of the part has been instructed, the processing moves to S606. If not, the processing moves to S610.

In S606, the parts data acquiring unit 322 acquires model data regarding the part identified in S602 from the secondary storage device 206 or a storage service on the network on the basis of the parts information 321. In this case, the parts data acquiring unit 322 may use the part ID only to acquire the model data.

In S607, the part forming control unit 323 uses the model data acquired in S606 to request execution of the forming to the 3D printer control application 313.

In S608, the parts information management unit 319 records, in the parts information 321, the fact that the forming of the part has been executed. As in the example in FIG. 4, the date and time when the forming is executed in S607 is recorded under "FORMING DATE/TIME".

Figure 8:
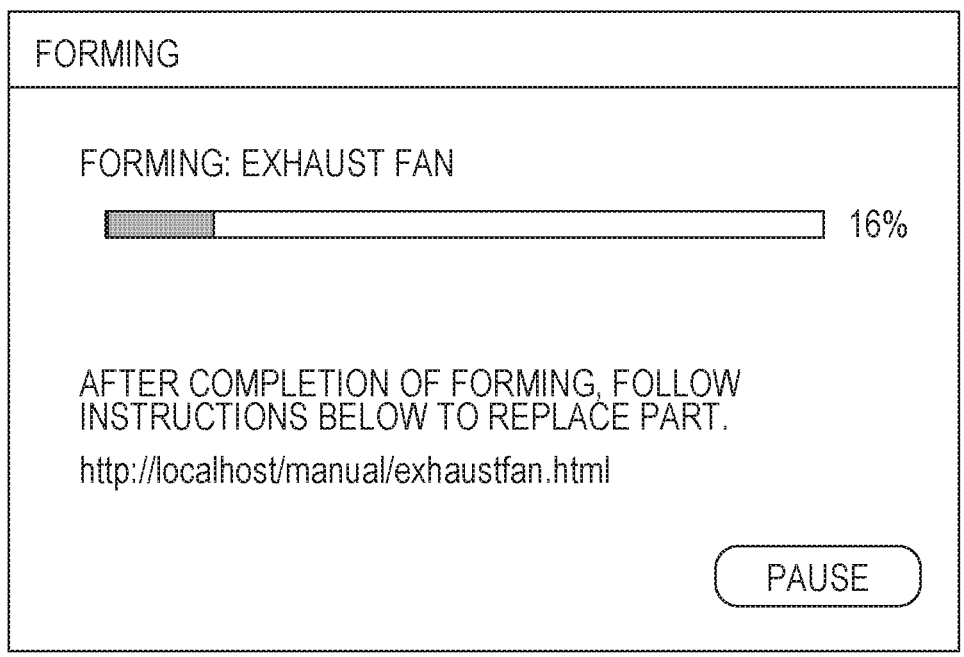
FIG. 8 illustrates a screen example to be displayed on the user interface in a step in the processing in FIG. 6.

In S609, the part forming control unit 323 presents replacement instructions for the formed part to a user through the user interface 314 (FIG. 8, which will be described below).

Figure 7B:
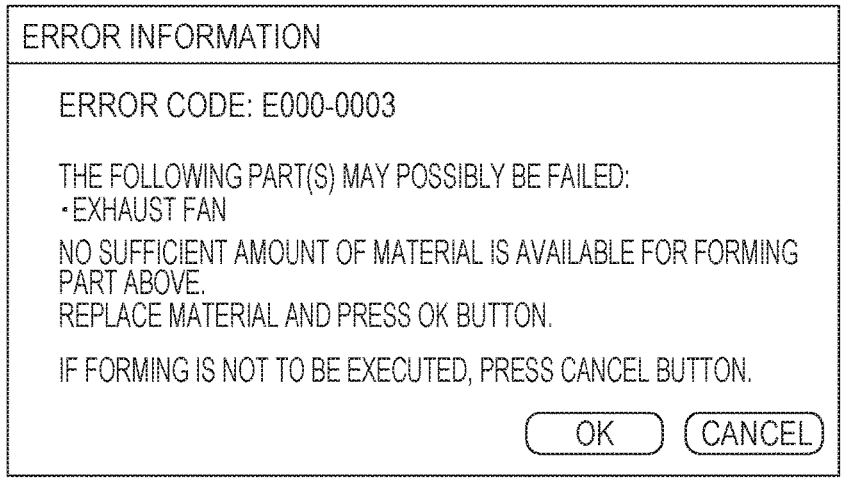
Figure 7C:
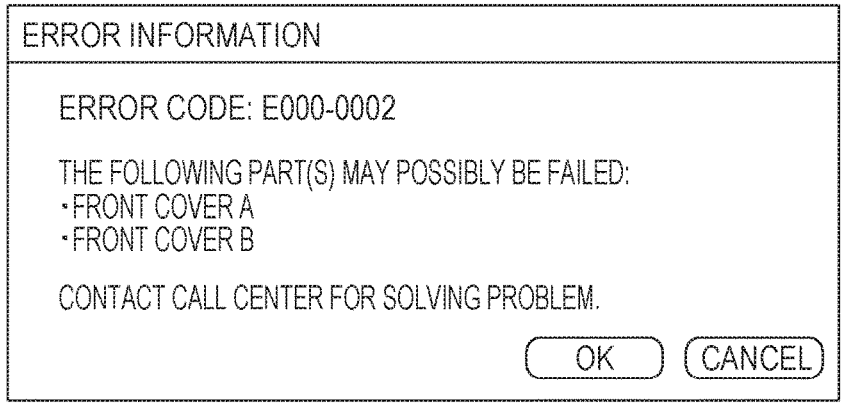

In S610, the part forming control unit 323 presents a screen prompting a user to contact a call center for solving an error through the user interface 314 (FIG. 7C, which will be described below).

The processing in S606 may be performed before the processing in S603. In other words, the part forming control unit 323 may judge whether the part can be formed or not after the parts data acquiring unit 322 acquires the model data regarding the part.

FIGS. 7A to 7C illustrate screen examples of the user interface 314 to be displayed when an error occurs.

FIG. 7A illustrates a screen example to be displayed in S604. The screen example displays that an error with error code=E000-0003 occurs and whether an exhaust fan is to be formed as a part corresponding to the error or not is inquired to a user. An approximate forming time and an approximate material usage are values recorded in the parts information 321 in FIG. 4.

FIG. 7B illustrates a screen example displayed in S604. The screen notifies a user of that the error code is identical to the one in FIG. 7A but the forming cannot be executed because the remaining amount of the material mounted in the 3D printer 102 is insufficient. After the material is replaced to make the remaining amount sufficient and an OK button is pressed, the screen in FIG. 7A is displayed again.

FIG. 7C is a screen example to be displayed in S610. The screen displays that an error with error code=E000-0002 occurs and a front cover A and a front cover B are listed as parts corresponding to the error. However, because the error information in FIG. 5 describes that those parts cannot be formed, a user is prompted to contact a call center.

FIG. 8 illustrates a screen example to be displayed on the user interface 314 in S609. The screen presents, to a user, replacement instructions for a part that is being formed. As illustrated in FIG. 8, a URL where a manual including the replacement instructions is available.

FIG. 9 illustrates examples of error information to be transmitted from the 3D printer 102 to the management server 104. The error information in FIG. 9 may be recorded in the secondary storage device 206 by the embedded computer 312 and may be transmitted to the management server 104 through the data transmitting/receiving unit 315 at a predetermined time point.

The example in FIG. 9 shows that forming has been executed after an error has occurred and that the error has been solved then. The examples in FIG. 9 are given in a general log format recording dates and times and messages. However, any format of information and any way of transmitting can be applied if the information regarding the 3D printer 102 can be acquired by the management server 104. For example, protocols such as SNMP (Simple Network Management Protocol) and IPP (Internet Printing Protocol) may be used to transmit information regarding the 3D printer 102.

FIGS. 10A to 10C illustrate the 3D printer management screen examples to be displayed on the user interface 201 of the management server 104.

FIG. 10A illustrates a screen displaying a printer list. The example in FIG. 10A displays that three 3D printers with names of "PRINTER 1" to "PRINTER 3" under an item "PRINTER NAME" are managed and that an error is occurring in the PRINTER 3. In this state, the user interface 314 displayed for "PRINTER 3" displays a screen as illustrated in FIGS. 7A and 7B. In response to a pressing operation performed on a DETAIL button 1001, a screen showing detail information such as a setup location and an e-mail address of a printer administrator of the corresponding printer is displayed.

FIGS. 10B and 10C illustrate printer details screen examples to be displayed in response to a pressing operation performed on the DETAIL button 1001. The examples in FIGS. 10B and 10C mainly display printer information and status information describing an operating status of the corresponding printer. As the printer information, basic attribute information on the corresponding printer such as a printer name, a model, and a setup location may be displayed. A user may press an EDIT button 1002 to correct partial information such as a printer name and a setup location. Under an item "STATUS", information describing a current status of the corresponding printer, such as a type of mounted material, the remaining amount of the material, and an error occurrence state is displayed.

Referring to FIG. 10B, an error status 1003 is displayed under STATUS. Referring to FIG. 10C, parts information 1004 is displayed under STATUS. The information illustrated in FIGS. 10A to 10C may be acquired by the management server 104 from the corresponding 3D printer by using a communication unit based on SNMP at a predetermined time point. Alternatively, the information may be notified to the management server 104 from the 3D printer 102 by using a similar communication unit at a predetermined time point.

When the management server 104 detects execution of forming in the 3D printer 102, the information may be transferred along with an expected time of completion of the forming to the corresponding call center. Thus, for example, in a case where the part corresponding to an occurring error can be formed in the 3D printer but it is difficult for a user to replace it, a service engineer may be called and at the same time the part may be formed for efficient replacement of the part.

The parts information 1004 describes a part formed by a user to be replaced. In general, quality control over user-formed parts may be less sufficient than quality control over parts manufactured by vendors. Thus, behaviors of a printer management function may be changed in accordance with the presence/absence of a part formed by a user. For example, the required range of a room temperature as an operation environment for the 3D printer 102 may be reduced, or the preset life of a part based on the use frequency may be reduced.

According to the first embodiment, a part to be replaced is identified on the basis of the error occurring in the 3D printer, and a user is prompted to form and replace the part so that the user can solve the error quickly.

First Application Example

According to the first embodiment, the part management unit 317 acquires an error code indicating that an error has occurred in a 3D printer and, in a case where a part corresponding to the error code is formable in the 3D printer, instructs to form the part. On the other hand, according to a first application example, the information to be acquired from a 3D printer by the part management unit 317 is not limited to an error code. More specifically, the part management unit 317 may acquire information (such as counter information and status information) describing an operating status of the 3D printer or information (alert information or alarm information) regarding an event detected by the 3D printer. The part management unit 317 identifies a part being a forming target on the basis of the acquired information. The identifying of a part also includes identifying identification information regarding the part. The identification information regarding the identified part may be used to acquire model data of the part.

According to this application example, the part management unit 317 can instruct to form the part in consideration of timing for replacing the part on the basis of the counter information regarding the part. For example, counter information regarding a print head may be the number of times of stacking and a time period used for forming it. The forming of a part may be instructed before the lifetime of the part ends in consideration of preset durability times or a preset time period. The part management unit 317 may instruct the forming by predicting possible failures of a part in consideration of not only the counter information regarding the part but also status information regarding the part. For example, even in a case where the time period used for forming a print head is shorter than a preset time period, a failure may be discovered from status information regarding the print head so that a print head to replace may be formed before an error occurs actually.

According to this application example, in the table illustrated in FIG. 5, an event code output by a 3D printer is managed in association with information regarding a part, instead of "ERROR CODE". The event code here is a code indicating that the lifetime of a part will end soon on the basis of counter information regarding the part. Instead of an event code output by a 3D printer, the part management unit 317 may identify a part likely having a failure on the basis of status or counter information regarding the 3D printer. The formability of a part may be determined on the basis of the size of the part or the type of consumable material to be used for forming the part, for example.

According to this application example, referring to the flowchart illustrated in FIG. 6, the part forming control unit 323 may identify a part being a forming target in S602 on the basis of information acquired from the 3D printer in S601. In S610, the part forming control unit 323 may display a screen for ordering a part through the user interface 314.

The part management unit 317 may be provided within the print client 103, instead of within the 3D printer 102.

According to this application example, in consideration of timing for replacing a part identified on the basis of information acquired from a 3D printer, the part management unit 317 can instruct forming the part. Thus, a part in a 3D printer can be formed by the 3D printer, which may contribute to reduction of the time period for transporting the part and the cost and space for stock management thereof.

Second Embodiment

Figure 11:
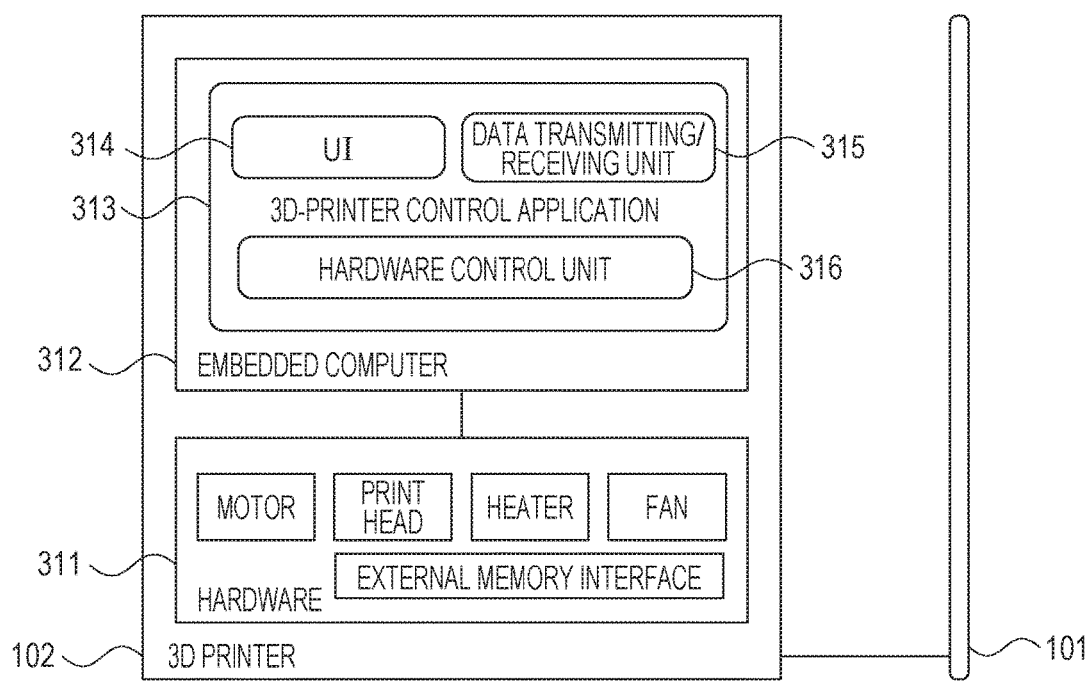
FIG. 11 illustrates an example software configuration and an example partial hardware configuration of the 3D printer.
Figure 12:
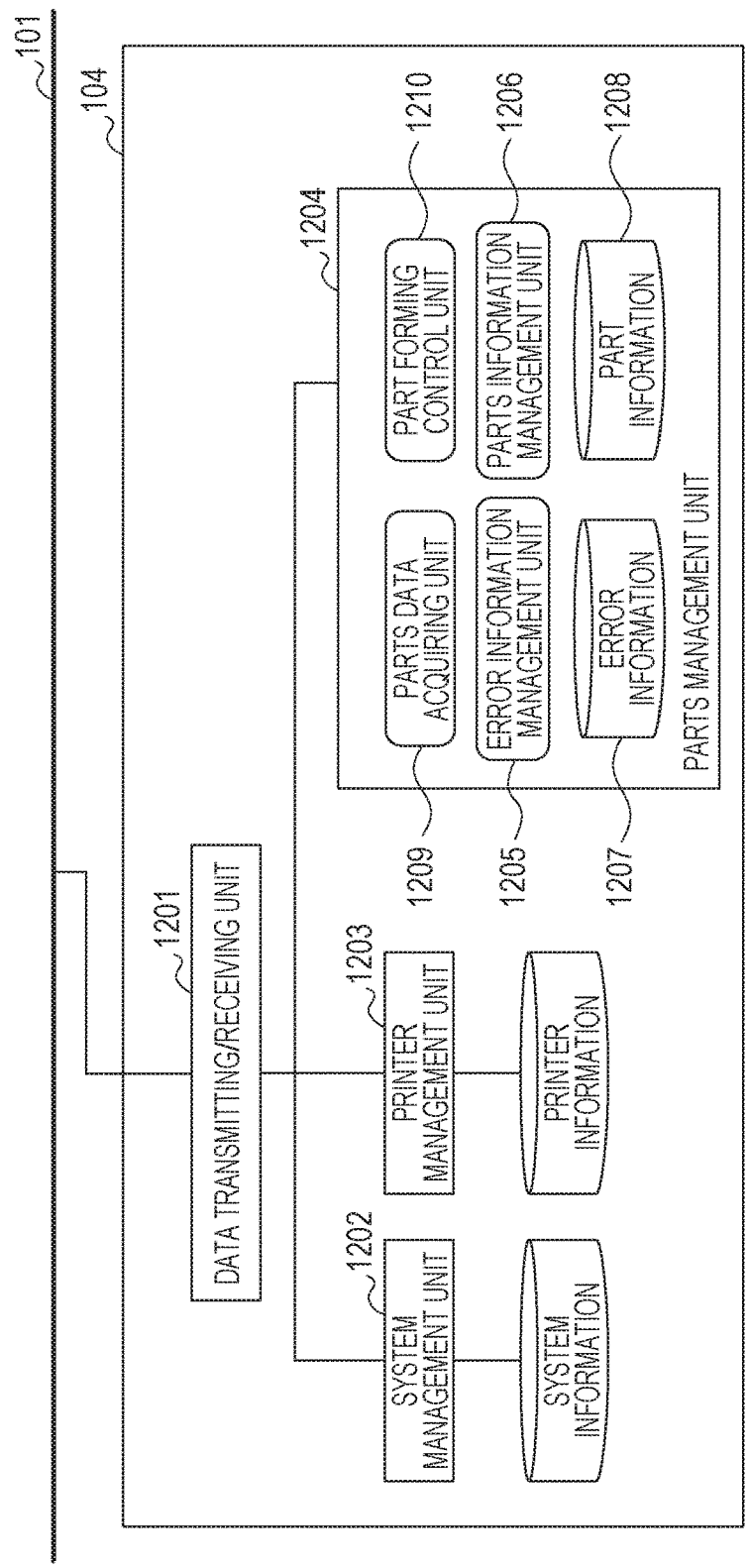
FIG. 12 illustrates an example software configuration of the management server.

According to a second embodiment of the present disclosure, a part to be replaced for solving an error occurring in an electronic apparatus is formed in a 3D printer. The second embodiment is different from the first embodiment in that a parts management unit is provided in the management server 104 instead of in the 3D printer 102 (FIGS. 11 and 12). Parts information and error information include information regarding a plurality of models (FIGS. 13 and 14). According to this embodiment, the management server 104 manages information regarding various kinds of electronic apparatus including the 3D printer 102.

Because the second embodiment has the same configurations as those illustrated in FIG. 1, FIG. 2, and FIG. 10 according to the first embodiment and because like numbers refer to like parts in the first and second embodiments, any repetitive description will be omitted. Differences from the first embodiment will be described below.

FIG. 11 illustrates a software configuration and a partial hardware configuration of the 3D printer 102. FIG. 11 is different from FIG. 3 in that the parts management unit 317 is not provided. According to the second embodiment, the parts management unit is provided in the management server 104 (FIG. 12).

FIG. 12 illustrates a software configuration of the management server 104.

A data transmitting/receiving unit 1201 is capable of receiving information from the 3D printer 102 and transmitting control instructions to the 3D printer. The data transmitting/receiving unit 1201 may provide a printer management screen to a web browser running on a terminal such as the print client 103 and receive a printer management request. A system management unit 1202 is configured to manage an operating status of and settings for a management system. A printer management unit 1203 is configured to manage operating statuses of and settings for printers managed by the management system.

A parts management unit 1204 is configured to manage information regarding parts usable in the printers managed by the management server 104 and use states of parts actually mounted in the printers. The components from the parts management unit 1204 to the part forming control unit 1210 have substantially the same functions as those of the components from the parts management unit 317 to the part forming control unit 323 in FIG. 3. Error information 1207 and parts information 1208 are different from the first embodiment in that they store information regarding a plurality of models.

The parts information 1208 and the error information 1207 may be recorded in the secondary storage device 206 by an installer upon installation of the management system. The parts information 1208 and the error information 1207 may be downloaded from a website of a printer vender through the network 101 and over the Internet.

According to this embodiment, the parts information 1208 may manage information regarding electronic apparatuses excluding 3D printers in the same manner as that for 3D printers. In this case, an item "MODEL" corresponds to model information for identifying the electronic apparatuses. The electronic apparatuses may include peripherals such as a printer, a scanner, and a copier which can output a two-dimensional printed material, network cameras, and home appliances.

FIG. 13 illustrates examples of the parts information 1208 according to this embodiment. FIG. 14 illustrates examples of the error information 1207 according to this embodiment. The information under "MODEL" is provided in addition to the information in FIGS. 4 and 5. Referring to FIG. 14, two types of "FORMABILITY" items are provided which correspond to information regarding formability of a part with "PART ID" in the 3D printer 102 upon occurrence of an error. One of the "FORMABILITY" items corresponds to whether the part can be formed in the 3D printer having the error, and the other one corresponds to whether the part can be formed in another 3D printer different from the 3D printer having the error. The latter describes whether the part can be formed in another 3D printer that is operating normally.

Figure 15:
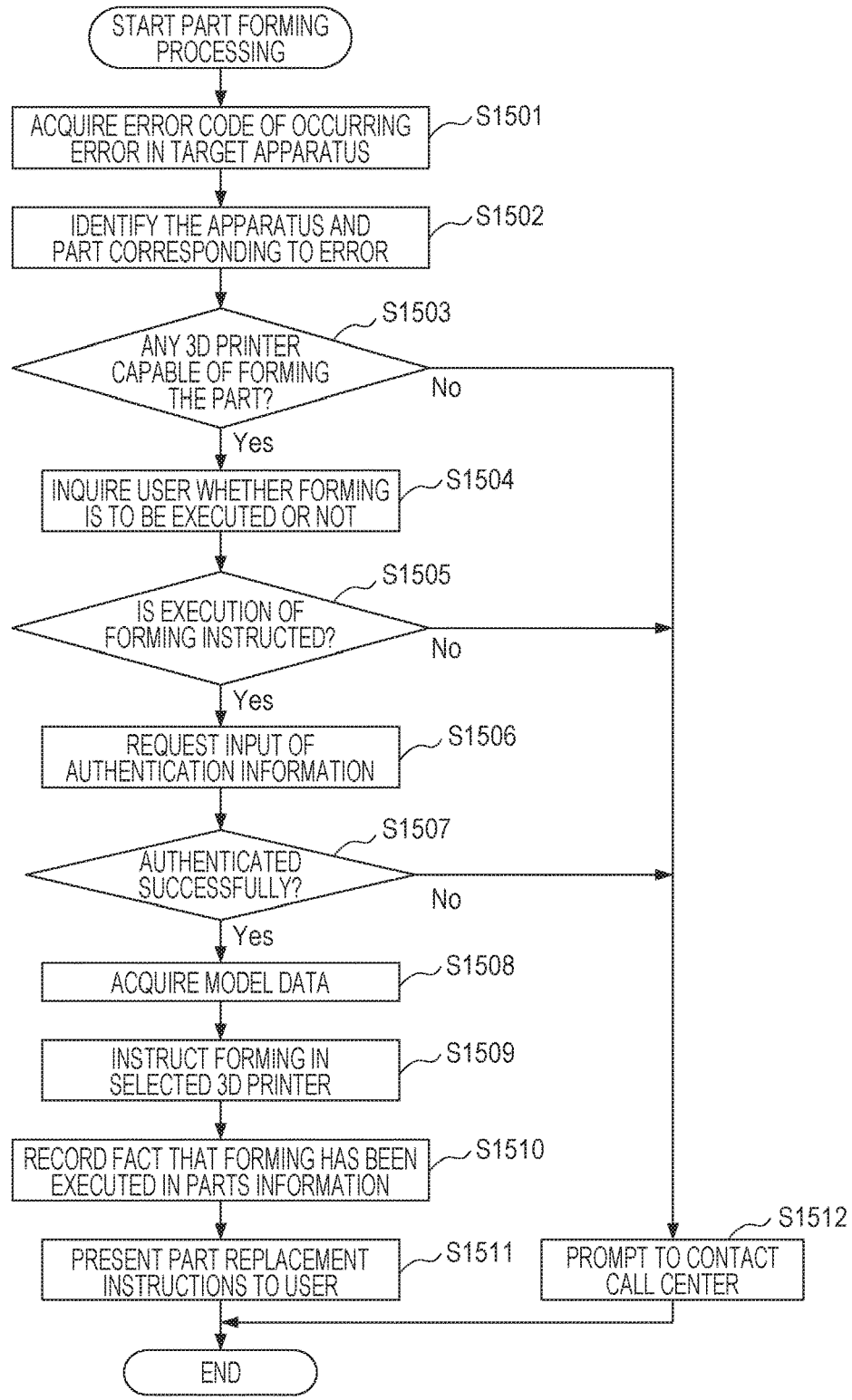
FIG. 15 is a flowchart illustrating an example flow of part forming processing to be performed in the management server 104 in a case where an error occurs in the 3D printer.

FIG. 15 is a flowchart illustrating a flow of part forming processing to be performed in the management server 104 when an error occurs in the 3D printer 102. The processing illustrating in the flowchart in FIG. 15 is executed by the parts management unit 1204. In other words, the processing in the flowchart in FIG. 15 may be implemented by the CPU 203 in the management server 104 by loading and executing a program recorded in the secondary storage device 206.

In S1501, the part forming control unit 1210 acquires an error code of an error occurring in a target electronic apparatus from the printer management unit 1203. An electronic apparatus in which forming is to be performed is designated by a user of the management system through the user interface 201 (FIGS. 10 and 16). The subsequent processing will be described more specifically by assuming that the electronic apparatus having an error is a 3D printer (hereinafter, called a "printer"), for example.

In S1502, the part forming control unit 1210 identifies a model of the apparatus having the error and a part corresponding to the error. The part forming control unit 1210 acquires detail information regarding the error corresponding to the error code acquired in S1501 from the error information 1207 through the error information management unit 1205 and identifies the part corresponding to the error.

In S1503, the part forming control unit 1210 judges whether the part identified in S1502 can be formed or not on the basis of the error information 1207 and the parts information 1208. More specifically, if the value of "FORMABILITY" for the part corresponding to the error in the apparatus in FIG. 14 is "TRUE" and if a consumable material prepared usably for forming in the 3D printer 102 satisfies a condition, it is judged that it can be formed. In order to satisfy the condition for a consumable material, the type of material mounted in the 3D printer 102 corresponds to the RECOMMENDED MATERIAL" for the part corresponding to the error in FIG. 4, and a sufficient amount of the material is to be remained. The remaining amount of a consumable material may include the amount of a replaceable consumable material prepared in hand. If it is judged that the part can be formed, the processing moves to S1504. If it is judged that the part cannot be formed, the processing moves to S1512.

In S1504, the part forming control unit 1210 inquires a user whether forming of the part is to be executed or not through the user interface 201 (FIG. 16, which will be described below).

Here, when a user instructs to execute the forming in S1504, a forming apparatus in which the target part to be formed is determined. When it is judged in S1503 that the 3D printer is capable of forming the part, it is determined as a forming apparatus for forming the part. The part forming control unit 1210 may determine the forming apparatus for forming the part in consideration of an operating status of the forming apparatus. A status representing an operating status may be a status such as "forming" and "preparing", an error occurrence state, or information describing the type of a mounted material and the remaining amount of the material, for example. The management apparatus is configured to manage one or more forming apparatuses, but one or a plurality of forming apparatuses can be candidates for forming a part in an electronic apparatus.

In S1505, the part forming control unit 1210 judges whether a user has instructed to form the part or not. If it is judged that forming of the part has been instructed, the processing moves to S1506. If not, the processing moves to S1512.

Figure 17:
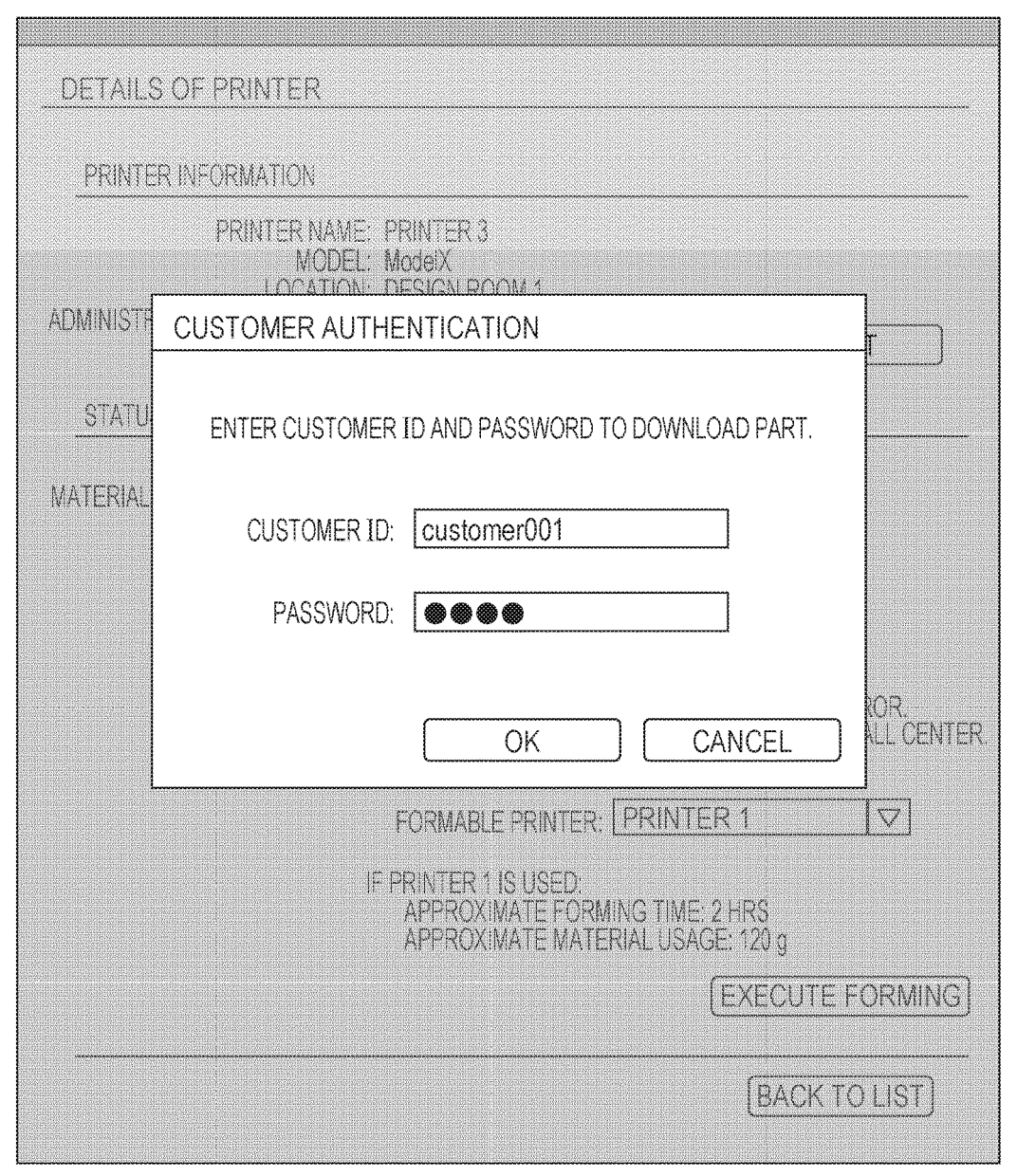

In S1506, the part forming control unit 1210 prompts a user to input user authentication information through the user interface 201 (FIG. 17). The authentication information to be used here is customer information previously registered by a user of the 3D printer with the vender of the 3D printer through an arbitrary measure such as by mail or over a network.

In S1507, the part forming control unit 1210 inquires an authentication service (not illustrated) of the 3D printer vender through the network 101 and over the Internet to judge the authentication information input in S1506 is valid or not. If the authentication succeeds, the processing moves to S1508. If it fails, the processing moves to S1512.

In S1508, the parts data acquiring unit 1209 accesses a download URL for the corresponding part recorded in the parts information 1208 and acquires the corresponding model data.

In S1509, the part forming control unit 1210 transmits the model data acquired in S1508 to the 3D printer selected in S1505 through the data transmitting/receiving unit 1201 and instructs execution of the forming.

In S1510, the parts information management unit 1206 records in the parts information 1208 that the forming of the part has been executed. In the examples in FIG. 13, the date and time when the execution of the forming has been instructed in S1509 is recorded under "FORMING DATE/TIME".

In S1511, the part forming control unit 1210 presents replacement instructions for the formed part to a user through the user interface 201.

In S1512, the part forming control unit 1210 prompts a user to contact a call center for solving an error through the user interface 201.

FIG. 16 illustrates an example of a screen showing 3D printer details on the user interface 201 of the management server 104. The screen in FIG. 16 is to be displayed in response to a pressing operation performed on the DETAIL button 1001 in FIG. 10A.

In the example in FIG. 16, an error with error code=E000-0003 is occurring in the printer 3, and a message 1601 prompting to form a part for solving the error is displayed. Printers which can form the part are displayed in a drop-down list 1602. The drop-down list 1602 is displayed if it is judged in S1503 that there are 3D printers which are capable of forming the part. In the example in FIG. 16, a printer 1 is selectable as a printer which is capable of forming an exhaust fan (with part ID=00000003) in the printer 3 (model="Model X"). If there is a plurality of 3D printers which are capable of forming the part, they are all selectable in the drop-down list. A display content of an approximate forming cost (forming time and material usage) 1603 in accordance with the selected 3D printer is displayed. Because an exhaust fan is to be formed here, the printer 3 having the error may sometimes be included in the drop-down list as a 3D printer that is capable of executing the forming.

The approximate forming cost 1603 depends on the performance of the 3D printer selected in the drop-down list 1602. The approximate forming cost 1603 may be calculated by multiplying a value of a forming cost for each part illustrated in FIG. 13 by a correction value, not illustrated, predetermined for each model of 3D printer.

In response to a pressing operation performed on an "EXECUTE FORMING" button 1604, the processing in S1506 and subsequent steps is executed, and the exhaust fan in the printer 3 is to be formed in the printer 1 in the example in FIG. 16.

FIG. 17 illustrates an example of an authentication information input screen in S1506. In response to a pressing operation performed on the "EXECUTE FORMING" button 1604, an authentication information input from illustrated in FIG. 17 is displayed.

According to the second embodiment, the management server 104 acquires model data from the Internet in S1508. However, each 3D printer may hold model data on a model of the 3D printer in a manner that the 3D printer can acquire the model data. In other words, as another example of the designation in FIG. 16, the management server 104 may acquire model data on the exhaust fan in the printer 3 from the printer 3 and may execute the forming in the printer 1.

In order to instruct the forming in S1509, the location of such model data may be transmitted so that the 3D printer can download the model data from the Internet.

According to the second embodiment, the management server 104 determines a 3D printer that is capable of forming a target part, and a user can select it so that the forming of the part can be instructed appropriately. The user authentication upon download of model data can reduce a risk that the model data is used for other purposes. It should be understood that the second embodiment can be implemented in combination with the first embodiment.

Second Application Example

According to the second embodiment, the part management unit 1204 acquires an error code indicating an error occurring in an electronic apparatus and instructs a 3D printer to form a part corresponding to the error code. On the other hand, according to a second application example, the information acquired from an electronic apparatus by the part management unit 1204 is not limited to an error code. For example, information (such as counter information and status information) describing an operating status of the electronic apparatus or information (alert information or alarm information) regarding an event detected in the electronic apparatus may be acquired. The part management unit 1204 identifies a part being a forming target on the basis of the acquired information. Thus, according to this application example, the part management unit 1204 can instruct to form the part in consideration of timing for replacing the part on the basis of the counter information regarding the part. The part management unit 1204 may instruct the forming by predicting possible failures of a part in consideration of not only the counter information regarding the part but also status information regarding the part.

Third Embodiment

A third embodiment of the present disclosure is different from the first and second embodiments in that a parts management unit is provided in a parts management service 1802 (FIG. 19) instead of in the 3D printer 102 or in the management server 104. The third embodiment of the present disclosure is further different from the first and second embodiments in that no error information is present, and parts information includes vender information (FIG. 20). The parts information may be registered by a vendor of the 3D printer 102 or the management server 104, or other product vendor may register information regarding a part relating to an arbitrary product.

Because the third embodiment has the same configurations as those illustrated in FIGS. 1 to 17 according to the first and second embodiments and because like numbers refer to like parts in the first to third embodiments, any repetitive description will be omitted.

Figure 18:
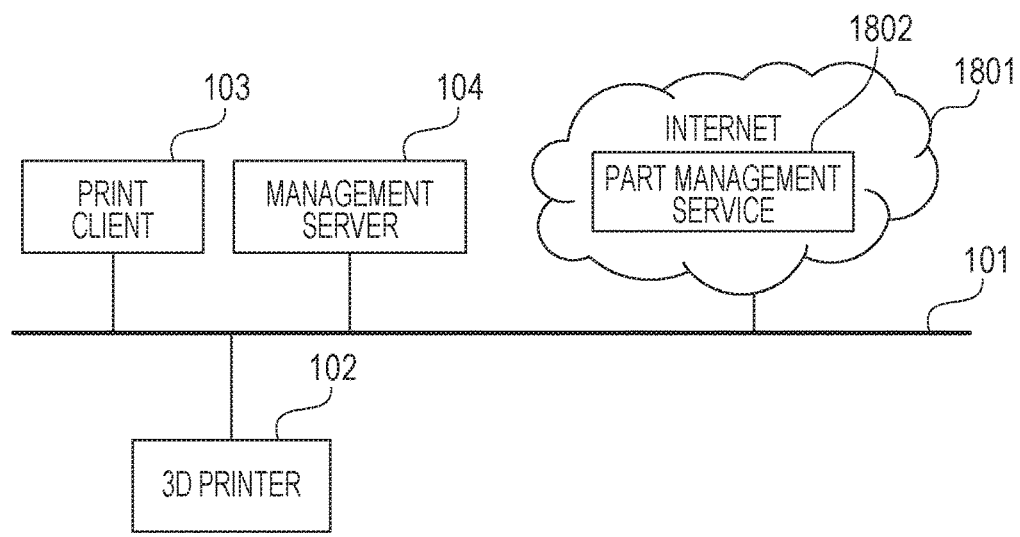
FIG. 18 illustrates an example configuration of a system.

FIG. 18 is a block diagram illustrating a configuration of a system according to the third embodiment of the present disclosure. FIG. 18 illustrates the Internet 1801. FIG. 18 further illustrates a system 1802 configured to provide a parts management service established over the Internet. The parts management service (also called a parts management system) 1802 has the module configuration illustrated in FIG. 2, like the print client 103 and the management server 104.

Figure 19:
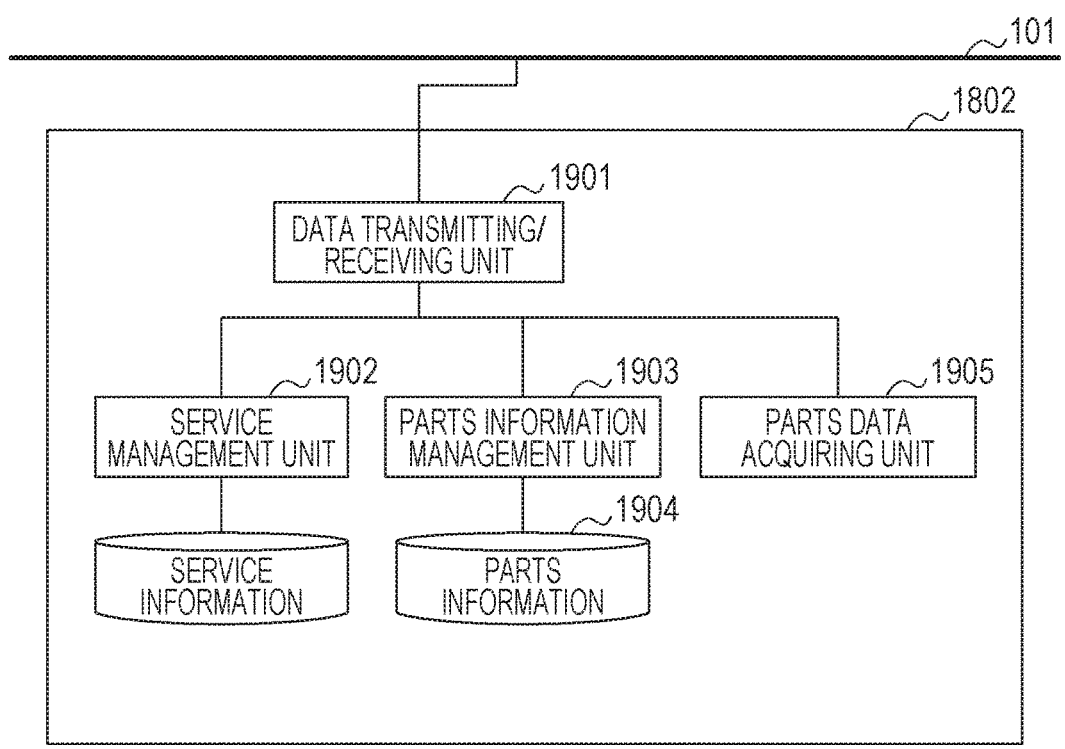
FIG. 19 illustrates an example software configuration of a parts management service.

FIG. 19 illustrates a software configuration of the parts management service 1802.

A data transmitting/receiving unit 1901 is configured to receive a request for part data from the 3D printer 102, the print client 103, or the management server 104 and to transmit the part data in response to the request. The service management unit 1902 is configured to manage an operating status of and settings for the parts management service 1802. A parts information management unit 1903 is configured to manage information regarding parts provided by the parts management service 1802 as parts information 1904. A parts data acquiring unit 1905 is configured to acquire model data regarding the corresponding part from the parts information 1904 or an external website in response to a part data request received by the data transmitting/receiving unit 1901.

FIG. 20 illustrates examples of the parts information 1904. Any repetitive descriptions will be omitted for common columns to those in FIGS. 4 and 13.

An item "PRODUCT CODE" corresponds to an identifier for uniquely identifying a product. An item "PRODUCT NAME" corresponds to a name of a product. An item "PRODUCT VENDOR" corresponds to a name of a manufacturer or a seller of a product.

The parts information 1904 can manage a part in a product (electronic apparatus) other than a 3D printer if no combinations of a product code and a part ID overlap with each other and can also manage products of a plurality of product vendors. The information regarding parts may be registered with the parts information 1904 arbitrarily by the corresponding product vendor on an administrative screen, not illustrated, displayed by the parts management service 1802 accessed through a web browser.

Figure 21:
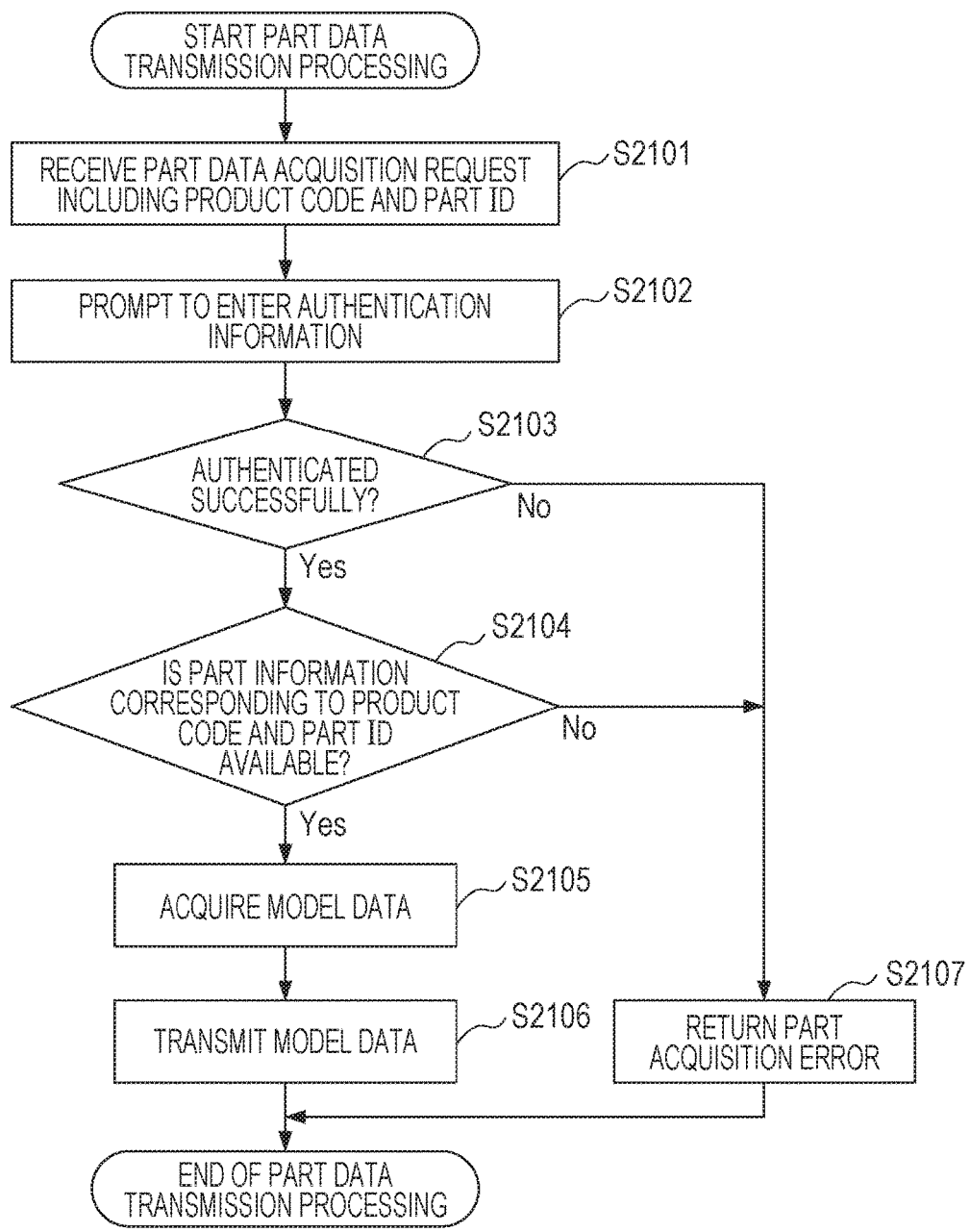
FIG. 21 is a flowchart illustrating an example flow of processing to be performed by the parts management service for responding to a part data acquisition request.

FIG. 21 is a flowchart illustrating a flow of processing to be performed by the parts management service 1802 in response to a part data acquisition request. The processing illustrated in the flowchart in FIG. 21 is implemented by the CPU 203 included in the parts management service 1802 by loading and executing a program recorded in the secondary storage device 206.

In S2101, the data transmitting/receiving unit 1901 receives a part data acquisition request including a product code and a part ID from a requestor (a terminal such as the 3D printer 102, the print client 103, or the management server 104).

In S2102, the data transmitting/receiving unit 1901 requests the requestor to input authentication information. The authentication information input screen is equivalent to the dialog illustrated in FIG. 17.

In S2103, the data transmitting/receiving unit 1901 judges whether the authentication information input in S2102 is valid or not. The authentication processing may be executed by the parts management service 1802 or may be a website of a product vendor of the product recorded in the parts information 1904. In a case where the authentication is executed by a website of a product vendor, the authentication information input in S2102 is transferred from the parts management service 1802 to the website of the product vendor. Alternatively, URL redirect may be used to directly transmit the authentication information from a requestor to the website of the product vendor. If the authentication indicates a result of success, the processing moves to S2104. If the authentication indicates a result of failure, the processing moves to S2107.

In S2104, the parts information management unit 1903 judges whether information corresponding to the product code and part ID received in S2101 exists in the parts information 1904. It so, the processing moves to S2105. If not, the processing moves to S2107.

In S2105, the parts data acquiring unit 1905 acquires the model data on the part on the basis of the parts information identified in S2104.

In S2106, the parts data acquiring unit 1905 transmits the model data acquired in S2105 to the requestor through the data transmitting/receiving unit 1901.

In S2107, the data transmitting/receiving unit 1901 transmits an error message that parts information cannot be acquired to the requestor.

Figure 22:
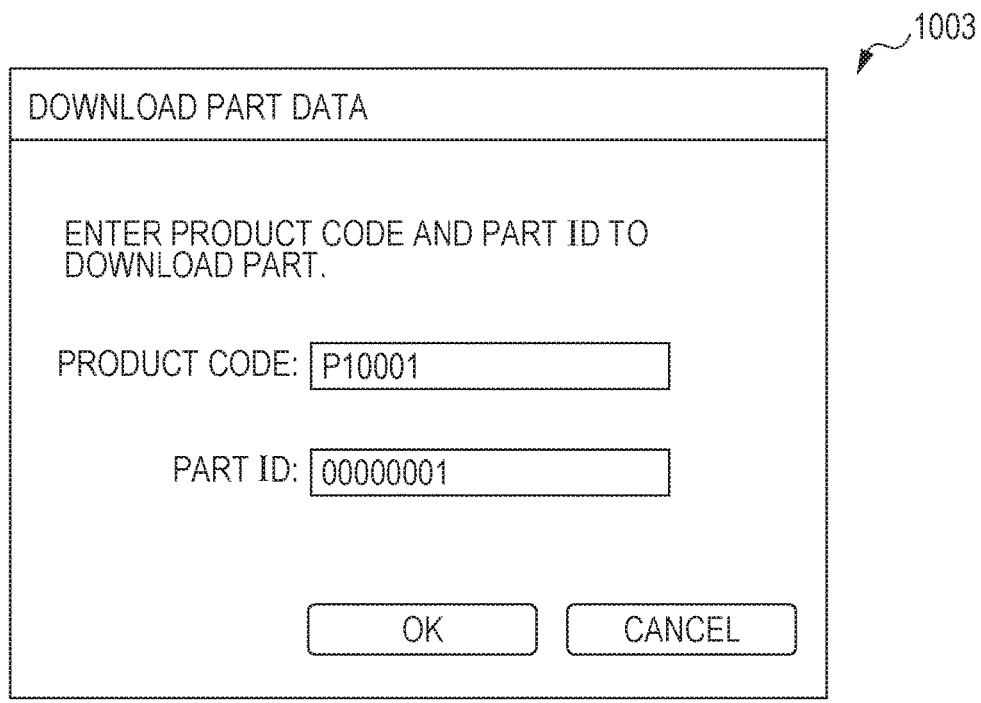
FIG. 22 illustrates an example of a screen to be displayed for downloading part data from the parts management service.

FIG. 22 illustrates an example screen displayed when part data is downloaded by using the parts management service 1802. The screen example in FIG. 22 is displayed on the user interface 201 of a requestor (a terminal such as the 3D printer 102, the print client 103, or the management server 104).

When the product code and the part ID are input and an OK button is pressed, the information is transmitted to the parts management service 1802. Thus, the flowchart in FIG. 21 is executed, and the model data can be downloaded. The product code and the part ID are available to a user by an arbitrary method and are written in a catalog or an operational manual of a product and may be generally open to public or may be informed limitedly to a specific user under a contract with a product vendor. In a case where the requestor is a 3D printer, the downloaded model data can be used to execute the corresponding forming directly. In a case where the requestor is a terminal other than a 3D printer, the downloaded model data can be used to instruct to form in a 3D printer so that the forming can be executed.

According to the third embodiment, part data is acquired by using the corresponding product code and part ID so that a 3D printer nearby may be used to form the part of the product as required. Thus, the product can be repaired or be customized easily.

The third embodiment may be implemented in combination with the first embodiment or the second embodiment. More specifically, immediately before the processing in S606 in FIG. 6 or in S1508 in FIG. 15 is executed, the processing in FIG. 21 may be executed in the parts management service 1802 in response to an instruction through the screen in FIG. 22, and model data of a part corresponding to an occurring error may be downloaded.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-057522 filed Mar. 22, 2016 and No. 2017-027291 filed Feb. 16, 2017, which are hereby incorporated by reference herein in their entirety.

What is claimed is:

1. An information processing apparatus comprising
a memory storing instructions, and
at least one processor executing the instructions causing the information processing apparatus to:
identify a part being a forming target in a forming apparatus on the basis of information acquired from the forming apparatus for forming a three-dimensional object, wherein, as the information acquired from the forming apparatus, at least one of counter information and status information is acquired;
acquire model data describing a shape of the identified part to form the part in the forming apparatus; and
transmit, to the forming apparatus, a request for forming the identified part by using the acquired model data before an error about the identified part occurs.

2. The information processing apparatus according to claim 1, wherein the instructions further cause the information processing apparatus to:
manage an association between alert information or alarm information available from the forming apparatus and the part in the forming apparatus, wherein, in a case where alert information or alarm information is acquired as the information acquired from the forming apparatus, a part associated with the alert information or the alarm information is identified; and
transmit, to the forming apparatus, a request for forming the identified part by using the acquired model data corresponding to the identified part.

3. The information processing apparatus according to claim 2,
wherein the instructions further cause the information processing apparatus to manage whether a part associated with alert information or alarm information acquired from the forming apparatus is formable by the forming apparatus or not,
wherein, in a case where the part associated with the alert information or alarm information acquired from the forming apparatus is not a part formable in the forming apparatus, the request is not transmitted to the forming apparatus; and
wherein, in a case where the part associated with the alert information or alarm information acquired from the forming apparatus is a part formable in the forming apparatus, the request is transmitted to the forming apparatus.

4. The information processing apparatus according to claim 1,
wherein the instructions further cause the information processing apparatus to manage information regarding a consumable material for forming the part; and
wherein, in a case where the identified part is a part formable in the forming apparatus and where a consumable material usably prepared for forming in the forming apparatus satisfies a condition based on information regarding a consumable material for forming the part, the request is transmitted to the forming apparatus.

5. The information processing apparatus according to claim 4,
wherein, in a case where the consumable material usably prepared in the forming apparatus is a material recommended for use for the forming of the part and where at least an amount of the consumable material for forming the part is provided, the consumable material usably prepared in the forming apparatus satisfies the condition based on the information regarding a consumable material for forming the part.

6. The information processing apparatus according to claim 1,
wherein the information processing apparatus is included in the forming apparatus.

7. A control method for an information processing apparatus, the control method comprising:
identifying a part being a forming target in a forming apparatus based on information acquired from the forming apparatus for forming a three-dimensional object, wherein, as the information acquired from the forming apparatus, at least one of counter information and status information is acquired;

acquiring model data describing a shape of the identified part to form the part in the forming apparatus; and transmitting, to the forming apparatus, a request for forming the identified part by using the acquired model data before an error about the identified part occurs.

8. The control method according to claim 7, further comprising:

managing an association between alert information or alarm information available from the forming apparatus and the part in the forming apparatus, wherein, in a case where alert information or alarm information is acquired as the information acquired from the forming apparatus, a part associated with the alert information or the alarm information is identified; and transmitting, to the forming apparatus, a request for forming the identified part by using the acquired model data corresponding to the identified part.

9. The control method according to claim 7, further comprising managing information regarding a consumable material for forming the part, wherein, in a case where the identified part is a part formable in the forming apparatus and where a consumable material usably prepared for forming in the forming apparatus satisfies a condition based on information regarding a consumable material for forming the part, the request is transmitted to the forming apparatus.

10. A non-transitory computer readable storage medium on which is stored a computer program for making a computer execute a control method for an information processing apparatus, the control method comprising:

identifying a part being a forming target in the forming apparatus based on information acquired from a forming apparatus for forming a three-dimensional object, wherein, as the information acquired from the forming apparatus, at least one of counter information and status information is acquired;

acquiring model data describing a shape of the identified part to form the part in the forming apparatus; and transmitting, to the forming apparatus, a request for forming the identified part by using the acquired model data before an error about the identified part occurs.

11. The non-transitory computer readable storage medium according to claim 10, further comprising:

managing an association between alert information or alarm information available from the forming apparatus and the part in the forming apparatus, wherein, in a case where alert information or alarm information is acquired as the information acquired from the forming apparatus, a part associated with the alert information or the alarm information is identified; and transmitting, to the forming apparatus, a request for forming the identified part by using the acquired model data corresponding to the identified part.

12. The non-transitory computer readable storage medium according to claim 10, further comprising managing information regarding a consumable material for forming the part, wherein, in a case where the identified part is a part formable in the forming apparatus and where a consumable material usably prepared for forming in the forming apparatus satisfies a condition based on information regarding a consumable material for forming the part, the request is transmitted to the forming apparatus.

\* \* \* \* \*